United States Patent
Fukano et al.

[11] Patent Number: 5,999,315
[45] Date of Patent: Dec. 7, 1999

[54] POLARIZER AND A PRODUCTION METHOD THEREOF AND AN OPTICAL ISOLATOR

[75] Inventors: Toru Fukano, Uji; Yasushi Sato, Tsuzuki-gun; Masato Shinya, Uji, all of Japan

[73] Assignee: Kyocera Corporation, Kyoto, Japan

[21] Appl. No.: 08/845,311

[22] Filed: Apr. 25, 1997

[30] Foreign Application Priority Data

Apr. 26, 1996 [JP] Japan ................................. 8-107108

[51] Int. Cl.⁶ .............................. G02B 5/30; C23C 14/00; C03B 19/01; B05D 5/06
[52] U.S. Cl. .......................... 359/492; 359/490; 359/484; 359/282; 427/163.1; 427/171; 372/703; 204/192.26; 204/192.28; 65/17.3; 65/60.2; 65/63
[58] Field of Search ................... 359/484, 485, 359/486, 490, 492, 281, 282; 427/162, 163.1, 165, 205, 171; 372/703; 204/192.11, 192.26, 192.28; 65/17.3, 60.2, 63

[56] References Cited

U.S. PATENT DOCUMENTS

| | | |
|---|---|---|
| 2,992,425 | 7/1961 | Pratt ........................................ 359/492 |
| 3,653,741 | 4/1972 | Marks . |
| 4,125,405 | 11/1978 | Araujo et al. . |
| 4,318,978 | 3/1982 | Borrelli et al. . |
| 4,479,819 | 10/1984 | Borelli et al. . |
| 4,486,213 | 12/1984 | Lentz et al. . |
| 5,122,907 | 6/1992 | Slocum ...................................... 359/492 |
| 5,151,956 | 9/1992 | Bloemer . |
| 5,305,143 | 4/1994 | Taga et al. ................................. 359/490 |
| 5,401,587 | 3/1995 | Motohir et al. . |
| 5,864,427 | 1/1999 | Fukano et al. ........................... 359/492 |

FOREIGN PATENT DOCUMENTS

| | | |
|---|---|---|
| 521591 | 1/1993 | European Pat. Off. . |
| 719742 | 7/1996 | European Pat. Off. . |
| 6265822 | 9/1994 | Japan ...................................... 372/703 |
| 7-56018 | 3/1995 | Japan . |

OTHER PUBLICATIONS

Jun–ichiro Katsu, et al., "Fabrication of Stretched Gold Island Films with Large Optical Anisotropy", Electronic and Communications in Japan, Part 2, vol. 7, pp. 21–25.
Kazutaka Baba, et al., "Silver–gold compound metal island films prpared by using a two–step evaporation method", Applied Physics Letter, 62 Feb. 1, 1993, No. 5, pp. 437–439.
Abstract of Japanese Patent 6273621.
Abstract of Japanese Patent 7056018.

*Primary Examiner*—Ricky D. Shafer
*Attorney, Agent, or Firm*—Loeb & Loeb LLP

[57] ABSTRACT

Plural layers of metallic particle layers in which metallic particles having morphological anisotropy are dispersed and dielectric layers are alternately stacked on at least one pricipal surface of a substrate having transparency to form a polarizing layer. The content of the group 0 elements in the polarizing layer is kept not higher than $1.5 \times 10^{20}$ molecules/cm³.

4 Claims, 8 Drawing Sheets

3

3

POLARIZER AND A PRODUCTION METHOD THEREOF AND AN OPTICAL ISOLATOR

FIELD OF THE INVENTION

The present invention relates to a polarizer that is used in optical communication equipment, optical recording equipment, optical sensors, etc. and a production method thereof, and in particular, to a polarizer wherein metallic particles having anisotropy are dispersed in a dielectric body and an optical isolator using the latter polarizer.

PRIOR ART

A polarizer is a device for producing light beam polarized in a specific direction and is used in optical communication, optical sensors, optical interferometers, etc. For example, in the case of optical communication, a polarizer is a principal component of an optical isolator. An optical isolator, for example, comprises a first polarizer, a Farady rotator and a second polarizer all arranged in a holder and on an optical axis and magnets coaxially arranged around the holder.

The holder is made of, for example, a Ni—Fe alloy, etc., and the polarizers are welded onto the holder with a low-melting-point glass or solder and hermetically sealed. With regard to the polarization performance, the values corresponding to a wavelength range used in the optical communication is important. An optical isolator is used in combination with, for example, a laser diode, etc. The first polarizer produces a light beam polarized in a specific direction. The Farady rotator rotates the direction of polarization. Then the second polarizer produces the light beam of which polarization direction has been rotated. In this way, no reflected light beam in the reverse direction is allowed to come out of the optical isolator.

At present, polarizers in practical use are mainly those produced by dispersing silver spheroidal particles in glass (U.S. Pat. Nos. 4,486,213 and U.S. Pat. No. 4,479,819). This polarizer is made by heat-treating a glass piece containing silver and halogen to precipitate particles of silver halide and heating and stretching the glass piece to stretch silver halide particles into spheroids. This process imparts anisotropy to silver halide particles. Then the glass piece is heated in a reducing atmosphere to reduce silver halide to metallic silver.

In this polarizer, however, the aspect ratio (the ratio of the major axis length to the minor axis length) is irregular; it is difficult to precipitate silver particles of which minor axis length and major axis length are regular. Moreover, it is difficult to reduce sliver halide in the interior portion of the glass piece, and opaque silver halide will remain there. Furthermore, as the glass shrinks in the course of reduction of silver halide, the glass surface will become porous, resulting in a drop in the long-term stability.

To solve these problems, it has been proposed to produce a polarizer by using a thin-film-forming process such as vacuum evaporation and sputtering (Denshi Joho Tsushin Gakkai, Autumn General Meeting of 1990, Preprints C-212). According to this proposal, a metallic layer is formed by vacuum evaporation on a dielectric substrate of glass, then a dielectric layer of glass is formed over the metallic layer by sputtering, etc. In this way, plural metallic layers and dielectric layers are built up alternately. Then the substrate is heated and stretched to deform the metallic layers into layers of discontinuous insular metallic particles. The respective metallic particles in the metallic layers are stretched in the direction of stretching to become spheroids, exhibiting polarizing capability.

The present inventors, however, found that, according to the above-mentioned production method, cracks would be generated in the uppermost dielectric layer surface after plastic deformation such as stretching under heated condition. The inventors energetically investigated the cause of this cracking and found that during heating for stretching, etc. to impart anisotropy to metallic particles, the sputtering gas that was used for forming the dielectric layers and contained in the polarizing layers was expanded to generate gas bubbles particularly in the interfaces between stacked layers. It was also found that subsequent plastic deformation such as stretching, extrusion, etc. broke the gas bubbles to generate cracks in the surface of the uppermost dielectric layer. The phenomenon of the inclusion of the sputtering gas in the films formed is normally called "gas entrainment," and when argon (Ar) is used as the sputtering gas the phenomenon is called "Ar trap." Such a phenomenon is inevitable when a sputtering machine is used.

Hence the proposed polarizers have not realized characteristics comparable to those of the polarizers obtained by the conventional production method wherein silver halide is precipitated in a glass piece and silver halide is stretched and reduced because the generation of cracks in the proposed polarizers caused scattering, etc. of light and in turn increased the insertion loss.

SUMMARY OF THE INVENTION

The object of the present invention is to provide a polarizer which is completely free of any possibility of generation of cracks in the polarizing layers due to entrainment of impurity gas and is excellent in polarizing characteristics and long-term reliability, a production method thereof, and an optical isolator.

A polarizer according to the present invention comprises a substrate having transparency and a polarizing layer, said polarizing layer being provided on at least one principal surface of the substrate and comprising alternately stacked plural metallic particle layers wherein metallic particles having morphological anisotropy are dispersed and dielectric layers, and the content of the group 0 elements in said polarizing layers being $1.5 \times 10^{20}$ molecules/cm$^3$ if or under. Preferably, said dielectric layers are formed by sputtering, and the content of the sputtering gas in said dielectric layers is kept not more than $1.5 \times 10^{20}$ molecules/cm$^3$, and more preferably, said sputtering gas is argon gas. The polarizer according to the present invention is produced by alternately repeating a process of forming a metallic particle layer comprising a large number of metallic particles and a process of forming, by sputtering, a glass layer on said metallic particle layer to produce a stack of plural alternate metallic particle layers and glass layers on at least one principal surface of a glass substrate having transparency, heat-treating said stack at a temperature being not lower than 300° C. and not higher than the glass transition point of the glass layers, then effecting plastic deforming of said stack under heated condition in a direction perpendicular to the stacking direction to impart morphological anisotropy to said large number of metallic particles and arrange them. The heat treatment of the stack is made till the content of the group 0 elements decreases to, for example, $1.5 \times 10^{20}$ molecules/cm$^3$ or under, and preferably till the content is reduced to $1.0 \times 10^{19}$ molecules/cm$^3$ or under. This heat treatment is given at a temperature that is lower than the temperature at the time of the plastic deformation under heated condition.

The polarizer according to the present invention is preferably used in an optical isolator; for example, it is arranged on the incident light side and/or the outgoing light side of a Farady rotator.

BRIEF DESCRIPTION OF THE ATTACHED DRAWINGS

EMBODIMENT

In the following, an embodiment of the present invention will be described with reference to the attached drawings.

Figure 1:
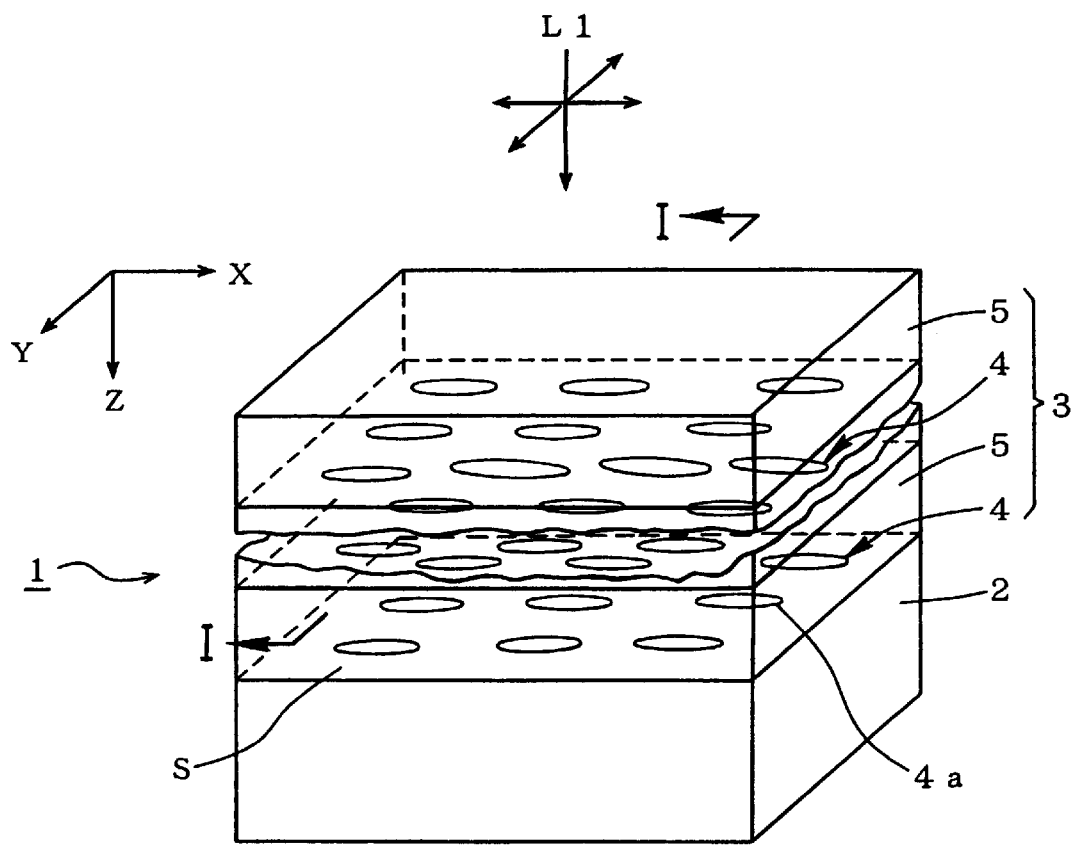
FIG. 1 is a perspective view showing the construction of a polarizer of an embodiment.
Figure 2:
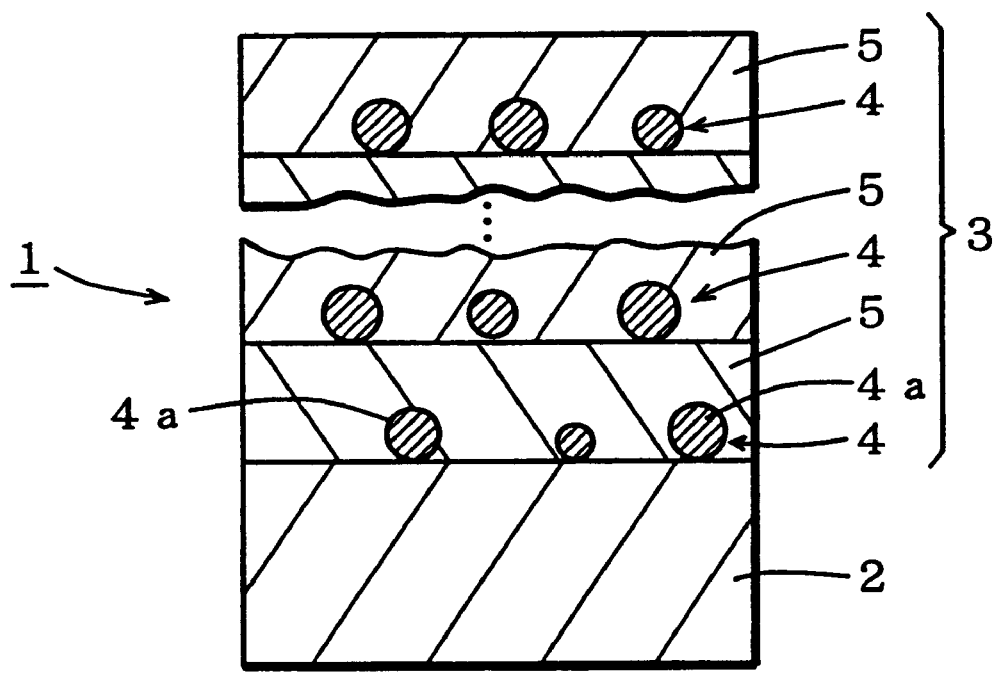
FIG. 2 is a partial sectional view of the polarizer of the embodiment.

As shown in FIG. 1 and FIG. 2, a polarizer 1 comprises a substrate 2 of a dielectric having transparency and a polarizing layer 3 provided on at least one principal surface thereof. The polarizing layer 3 comprises alternate plural metallic particle layers 4 and dielectric layers 5 formed on the dielectric substrate 2, said metallic layers 4 having a large number of metallic particles 4a with morphological anisotropy at a density of 40 particles/$\mu$m$^2$ (square micron) in the direction of the substrate surface. The content of the group 0 elements that are suitably used as sputtering gas (such as Ar, Ne and He) in the polarizing layer 3 is kept not more than $1.5 \times 10^{20}$ molecules/cm$^3$. Here having transparency means that the substance is transparent to a wavelength used. The density of the metallic particles 4a is the density in the direction of the surface S of the substrate; the density is measured in a plane containing the major axis of at least one metallic particle 4a (a plane parallel to the surface S of the substrate). In FIG. 1 and FIG. 2, some part of the stack of the metallic particle layers 4 and the dielectric layers 5 is omitted.

As for the material of the substrate 2, for example, borosilicate glass such as Pyrex glass (Pyrex is a trademark of Corning Inc.) or BK7 glass (BK is a trade name of HOYA Inc.) may be used. In addition to them, high melting point glass such as silica glass and low melting point glass such as soda-lime glass may be used. In place of these glass materials, other transparent materials may be used. Glass materials, however, are suitable for the use because they are inexpensive and can be stretched easily.

Of various glass materials, borosilicate glass is particularly suited for the substrate 2. The reason is that the coefficient of thermal cubical expansion of borosilicate glass is close to that of a metallic material used for the holder of an optical isolator. For example, the coefficient of thermal cubical expansion of borosilicate glass is close to the coefficient of thermal cubical expansion of a Ni—Fe alloy used as the holder material, $90 \sim 96 \times 10^{-7}$/° C. Thus sealing of the substrate to the holder is quite easy. For example, the coefficient of thermal cubical expansion of BK glass is about $72 \sim 89 \times 10^{-7}$/° C. and is very close to the coefficient of thermal cubical expansion of the Ni—Fe alloy; thus BK glass is suitable for the use.

As for the dielectric layers 5, it is desirable to use the same material as that of the substrate 2. For example, when Pyrex glass is used for the substrate 2, it is desirable to use Pyrex glass for the dielectric layers 5 so that both the substrate and the dielectric layers 5 have the same characteristics including coefficient of thermal expansion.

As for the metallic particles 4, it is desirable to select one or more metals from precious metals such as Au, Ag, Pt, Rh and Ir and transition metals such as Cu, Fe, Ni and Cr. It is desirable to use a metal that does not wet well the substrate 2 and the dielectric layers 5, coagulates easily, are hardly oxidized, and can be present as metallic particles 4a in the dielectric layers 5. Of the metals mentioned above, particularly preferable metals are Au that has a low melting point and coagulates easily, does not wet glass well, and is hardly oxidized, and Cu that is inexpensive and does not wet glass well. It should be noted that the metallic particles 4a are not limited to any single metal; alloys may be used.

The metallic particles 4a are spheroidal and have anisotrophy. In FIG. 1 (the direction of light propagation is Z, and a plane perpendicular to the direction Z is the plane X-Y), the direction of the major axis of a metallic particle 4a is the direction X, and the direction of its minor axis is the direction Y. The ratio of the major axis length to the minor axis length of a metallic particle 4a is defined as aspect ratio; here the mean of aspect ratios of a large number of metallic particles 4a is called the aspect ratio.

The metallic particles 4a become spheroidal because, after film formation of the polarizing layer 3 on the substrate 2, the substrate 2 is subjected to stretching; the metallic particles 4a together with the substrate 2 are elongated in the direction of stretching. The higher is the aspect ratio, the greater is the extinction ratio. At the same time, the stretching ratio of the substrate 2 will increase, making it difficult to stretch the substrate 2. Moreover, the rate of increase in the extinction ratio decreases in the higher aspect ratio region. Hence it is appropriate to set the aspect ratio in a range from 3 to 30, and preferably from 15 to 25. It should be noted that the extinction ratio is expressed, when a nonpolarized light of a specified wavelength is used, by the energy ratio, in decibel unit, of the transmitted light in the direction X and the transmitted light in the direction Y. When the minor axis lengths of the metallic particles 4a increase, the insertion loss of the polarized light to be transmitted in the direction Y will increase. Because of this, it is desirable to set the aspect ratio at 3 or over, preferably at 15 or higher and keep the minor axis lengths short and, in turn, keep the insertion loss low. When the mean major axis length of the metallic particles 4a increases, the absorption peak wavelength in the direction X will increase to approach the wavelength range used in optical communication (about 1.3 $\mu$m). However, when we consider that there is a productional limit to the aspect ratio of the metallic particles 4a, and the increase in the minor axis length will increase the insertion loss, the major axis length will have its limit. A preferable condition to the metallic particles 4a is that the aspect ratio is from 3 to 30, more preferable condition is that the aspect ratio is from 10 to 30, and the most preferable condition is that the aspect ratio is from 15 to 25.

The above-mentioned polarizer 1 is produced, for example, as shown below. First, a metallic thin film layer comprising a large number of metallic particulates is formed, by vacuum evaporation, on at least one principal plane of a glass substrate having transparency. This metallic thin film layer is heated to make the metallic particulates coagulate and form insular metallic particles. As a result, a metallic particle layer is formed. A glass layer is formed, by sputtering, on this metallic particle layer.

Moreover, on this glass layer, the above-mentioned process of forming a metallic particle layer and the process of forming a glass layer are alternately repeated to make a stack in which plural metallic particle layers and glass layers are stacked alternately.

Then this stack is heat-treated at a temperature that is 300° C. or over and not over the glass transition point of the glass layers. After the heat treatment, the stack is subjected to thermoplastic deformation in the direction perpendicular to the stacking direction to impart morphological anisotropy to a large number of metallic particles. The reason for giving the heat treatment to the stack at a temperature that is 300° C. or over and not over the glass transition point of the glass layers is to release the sputtering gas from the polarizing layer and reduce its content to $1.5 \times 10^{20}$ molecules/cm$^3$ or under. This process is particularly effective in preventing the insertion loss from increasing. The glass transition point of BK7 glass is 580° C. for example, and that of Pyrex glass is 550° C. As clearly shown in Table 1 below, the polarizing layer can be degassed without generation of any bubbles by degassing at a temperature that is not over the glass deformation point.

In this polarizer 1 produced as described above, as shown in FIG. 1, the polarized light component in the direction of X of an incident light L entering in the direction Z is absorbed by the resonance with free electrons of the metallic particles 5. On the other hand, the transmissivity of the polarized light component in the direction Y is high. As a result, a polarized outgoing light L2 will come out. The peak wavelength of absorption in the direction X and that in the direction Y differ from each other. The peak of absorption in the direction X is at a longer wavelength than that in the direction Y. It should be noted that, when not specified otherwise, the extinction ratio is determined for a wavelength at which the peak of absorption in the direction X occurs.

Hence, for example, if an optical isolator is configured by providing the above-mentioned polarizer 1 at least one of the incident light side and the outgoing light side of a Farady rotator and arranging so that the incident light enters the metallic particle layers 4 and the dielectric layers 5 of the polarizer 1, we can get an optical isolator having excellent characteristics and high reliability.

Experiment

A Control

A piece of BK7 glass measuring 76 mm×10 mm×1 mm was used as the substrate. The film making machine was a multi-target magnetron sputtering machine. The targets were copper for the metallic particle layers 4 of FIG. 1 and BK7 glass for the dielectric layers 5. The sputtering gas was argon. As for the sputtering conditions, RF power was 20 W, the sputtering pressure was about $2.0 \times 10^{-3}$ Torr, the flow rate of Ar gas was about 10 ccm, and the copper film thickness was set at about 24 nm. To make the copper particulates coagulate and grow, immediately after formation of a metallic film, the film was subjected to heat treatment at about 500° C. for 60 minutes. As a result, the copper particulates were made to grow into the copper particles of the desired size. The film thickness of copper was obtained as follows: The film thickness of a copper film that was formed for 20 minutes under the above-mentioned sputtering conditions was measured. Then the film forming speed was calculated. From this value, the film thickness of copper was derived.

Next, to bury copper particles in glass, a film of BK7 glass being the same material as the substrate was formed on the copper particle layer produced under the above-mentioned conditions. The film thickness was 250 nm. The above-mentioned process was repeated five times to make five dielectric layers 4. Then the above-mentioned sample was stretched by 50 mm by applying stresses of 45 kg/mm$^2$ in opposite directions along a line perpendicular to the stacking direction at 625° C. that was lower than the softening point (724° C.) of BK7 glass. The softening point of Pyrex glass is 820° C. It is desirable to stretch a stack at a temperature that is not higher than the softening temperature.

Thus, a polarizer approximately measuring 126 mm×3 mm×0.3 mm was obtained. The polarizer had a polarizing layer of about 400 nm thick (five dielectric layers; each one was about 80 nm thick) in which a large number of substantially spheroidal metallic particles, having an aspect ratio of about 10 (minor axis length was from 20 to 30 nm), were dispersed. However, there were cracks in the surface of this polarizer (the surface of the stack). The characteristics of this sample were measured by a spectral analyzer. The extinction ratio was 15 dB and the insertion loss was 2 dB. The results were not satisfactory.

Investigation of the Cause of Crack Generation

To examine the gas contained in bubbles in the polarizing layer, thermal desorption spectroscopy (TDS) analysis was given to the unstretched sample described in the above-mentioned control. The sample had five metallic particle layers and five dielectric layers, all stacked together. In TDS analysis, a specimen is heated in vacuum, and gases generated are subjected to qualitative analysis, and at the same time, any change in the degree of vacuum is also measured.

Figure 3:
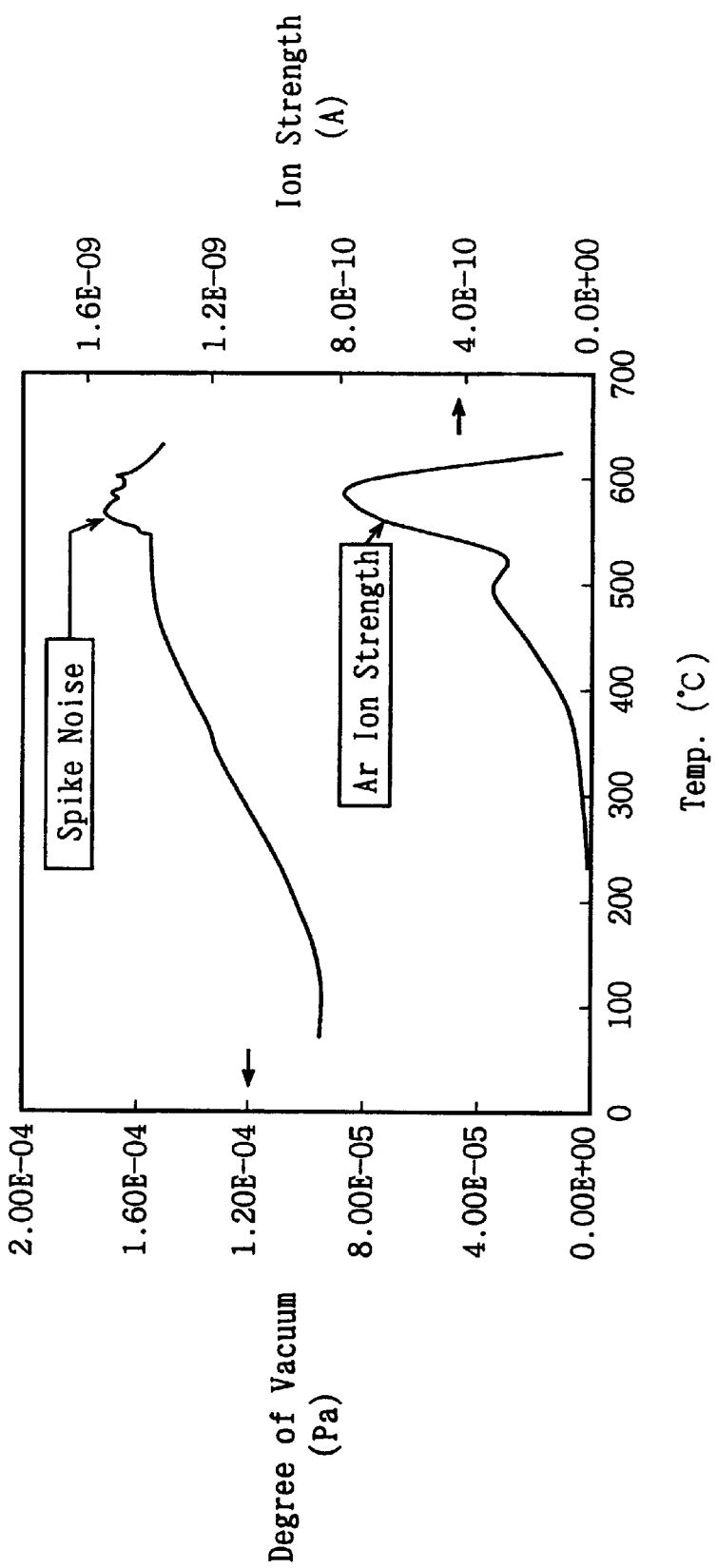
FIG. 3 is a characteristic diagram by TDS showing generation of gas bubbles from the polarizer.

The results are shown in FIG. 3. E on ordinate indicates exponent of 10. The heating temperature is taken on the X axis, and change in degree of vacuum and ion strength of Ar gas are taken on the Y axis. The chart shows that the degree of vacuum changed drastically from 550° C. to 600° C. This change was attributed to rupture of bubbles in the polarizing layer in this temperature range. The qualitative analysis confirmed the generation of Ar gas concurrently with the change in the degree of vacuum. It was also confirmed that Ar gas was generated even at temperatures below the temperature at which bubbles ruptured.

On the basis of the results described above, it was decided to reduce the gas content in the sample by giving heat treatment for a long time at a temperature at which no bubbles are generated.

First, to examine a temperature at which no bubble is generated and at the same time Ar gas can be degassed, namely, a temperature for reducing the Ar gas content in the sample, samples were heated in vacuum at various temperatures starting from 480° C. and incremented by 20° C. for about 15 minutes. The heated samples were visually checked for presence of bubbles in the interfaces of the stacked layers, and changes in surface roughness were measured. The results are shown in Table 1 and FIG. 4.

TABLE 1

| Heating temperature (° C.) | 480 | 500 | 520 | 540 | 560 | 580 |
|---|---|---|---|---|---|---|
| Presence of bubbles | None. | None. | None. | None. | None. | Present. |
| Surface roughness (Å) | 15 | 16 | 13 | 16 | 17 | 150 |

Figure 4:
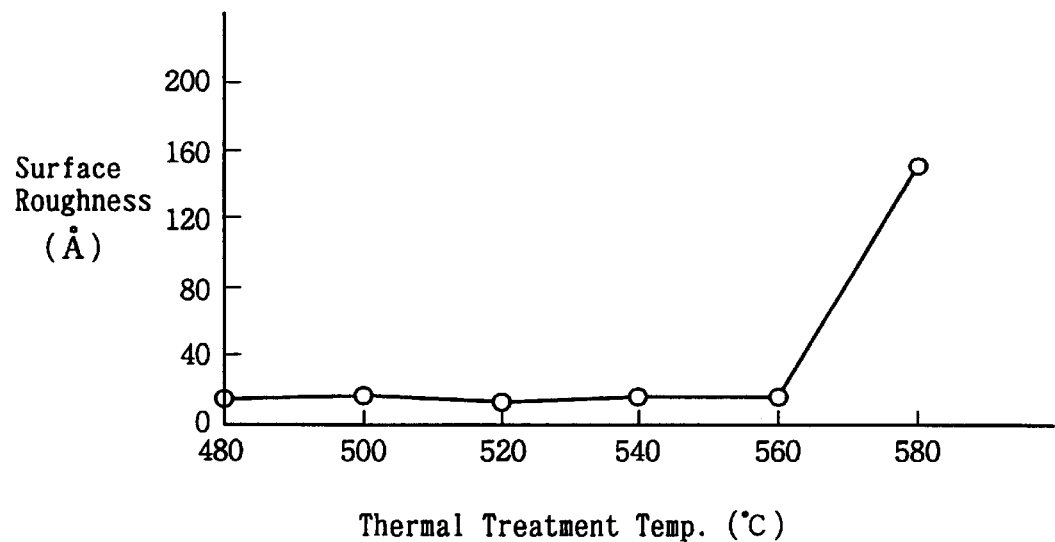
FIG. 4 is a characteristic diagram showing the relationship between heat treatment temperature and surface roughness of the polarizer before stretching.

As clearly seen in Table 1 and FIG. 4, when the heat treatment temperature is not higher than 560° C., no swell was observed on the surfaces of the stacks and no generation of bubbles in the interfaces of the stacked layers was observed. The surface roughnesses were from 13 to 17 Å;

there were almost no changes. On the other hand, when the heat treatment temperature was 580° C., the glass transition point of BK7 glass, visual inspection detected swells on the surface of the stack; generation of bubbles in the interfaces of the stacked layers was confirmed. Moreover, it was also confirmed that rapid changes in surface roughness occurred concurrently with the generation of bubbles. The surface roughness at the time was 150 Å that was ten or more times greater than the values of other samples that were free of bubbles. In consideration of these findings, we decided to set the heat treatment temperature for degassing at 560° C. When Pyrex glass was used for the substrate 2 and dielectric layers 5, bubbles were generated by degassing at 560° C. that was higher than the glass transition point (550° C.) of Pyrex glass, and the surface roughness increased. Degassing at 540° C. or under, that was below the glass transition point, did not generate any bubbles, and the surface roughness was successfully kept low at 20 Å or under. The degassing temperature is preferably below the glass transition point and not lower than the glass transition point minus 30° C.

Next, to check the effects of degassing by heat treatment, samples were heated in vacuum at about 560° C. for various heat treatment durations; 4 hours, 8 hours, 10 hours and 12 hours. The Ar gas content in each sample was measured after heat treatment. The samples were heated at 625° C. or stretching temperature, and after that, they were visually checked for presence of swell (bubbles). The surface roughness was also measured. The results are shown in Table 2 and FIG. 5. The degassing time is preferably not shorter than 8 hr, more preferably not shorter than 10 hr, and most preferably not shorter than 12 hr.

TABLE 2

Heat treatment conditions

| | No heat treatment | 560° C. 4 hr | 560° C. 8 hr | 560° C. 10 hr | 560° C. 12 hr |
|---|---|---|---|---|---|
| Presence of bubbles | Present. | Present. | Present. | None. | None. |
| Surface roughness (Å) | 151 | 147 | 140 | 120 | 15 |
| Ar content (molecules/cm$^3$) | $7.0 \times 10^{20}$ | $5.0 \times 10^{20}$ | $3.0 \times 10^{20}$ | $1.5 \times 10^{20}$ | $1.0 \times 10^{20}$ |

Figure 5:
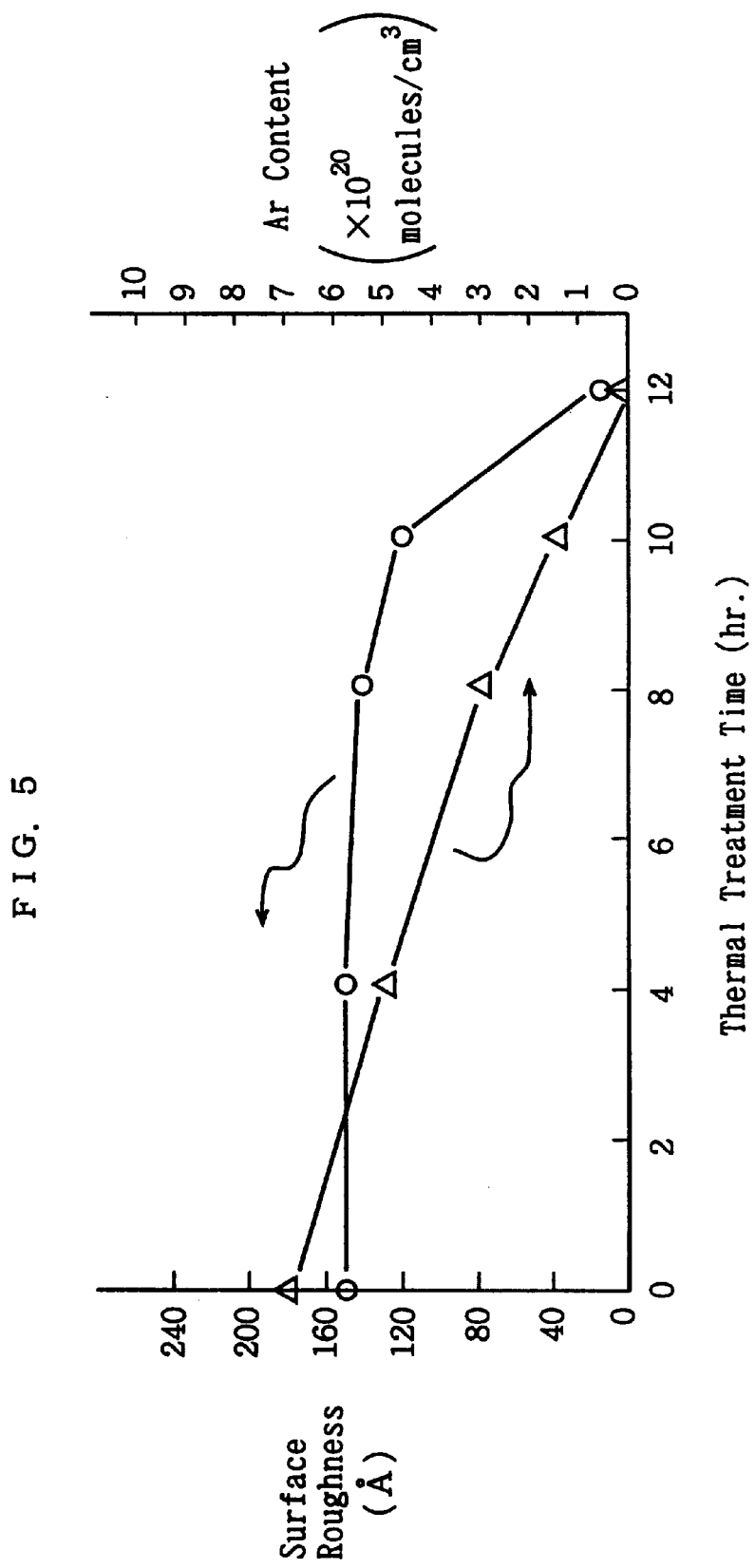
FIG. 5 is a characteristic diagram showing the relationship between the heat treatment time and the surface roughness of the polarizing layers and the relationship between the heat treatment time and the Ar content in the polarizing layers when the polarizer before stretching was heated in vacuum at 560° C.

As is clearly seen in Table 2 and FIG. 5, it was confirmed that heat treatment at 560° C. for ten hours reduced the Ar gas content in the sample to $1.5 \times 10^{20}$ molecules/cm$^3$, and when the sample was heated to 625° C. for stretching, almost no swell (bubbles) was generated on the surface of the stack. Specially, it was confirmed that heat treatment at 560° C. for twelve hours reduced the Ar gas content in the sample to $1.0 \times 10^{19}$ molecules/cm$^3$, and when the sample was heated to 625° C. for stretching, no swell (bubbles) was generated on the surface of the stack. Thus it was found that it is most desirable to reduce the Ar content to $1.0 \times 10^{19}$ molecules/cm$^3$ or under.

Production of Polarizer

In the light of the findings mentioned above, a stack was produced in the same way as the above-mentioned control, and after that, to reduce the Ar content in the polarizing layer of the sample, the sample was heated in a heating furnace at 560° C. for 12 hours. The atmosphere at the time was atmospheric one. As is clearly shown by degassing in the atmospheric atmosphere, any degassing atmosphere may be used. Preferably, the content of the group 0 elements is kept at 2 vol % or under (1 vol % in atmosphere).

Next, the sample was stretched at 625° C. by a stress of 45 kg/mm$^2$. The stack surface of the sample was examined. No swell was found, and no bubbles were generated in the interfaces of the stacked layers. The surface roughness was 20 Å or under. We were able to produce a stack with a very smooth surface.

The optical characteristics of this sample were measured by an optical spectral analyzer. The results were very satisfactory; the extinction ratio was 40 dB and the insertion loss was 0.1 dB.

Optical Isolator

FIG. 6 through FIG. 9 show an optical isolator 10 that was produced by using polarizers of the embodiment. In these diagrams, 11 denotes a holder; it is made of a Ni—Fe alloy, etc. 12 denotes a first polarizer. 13 is a Farady rotator and 14 is a second polarizer.

Figure 6:
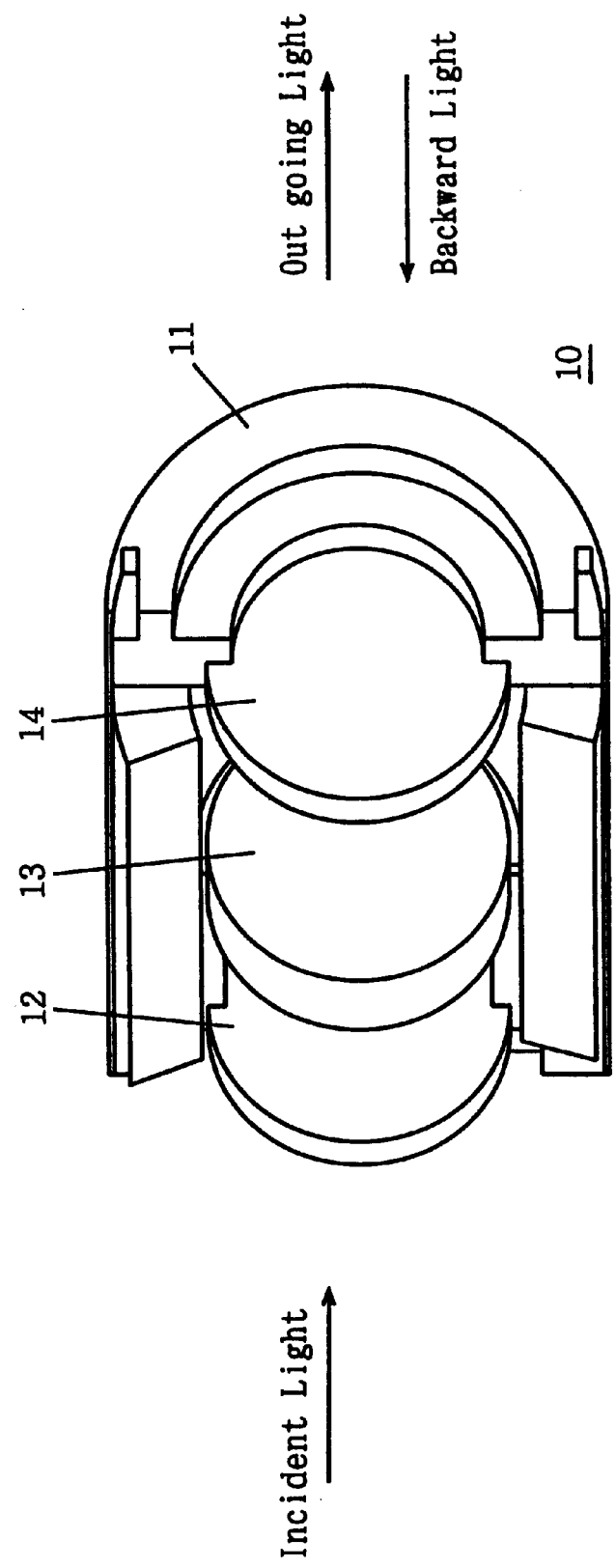
FIG. 6 is a diagram showing an optical isolator of an embodiment in disassembled state.
Figure 7:
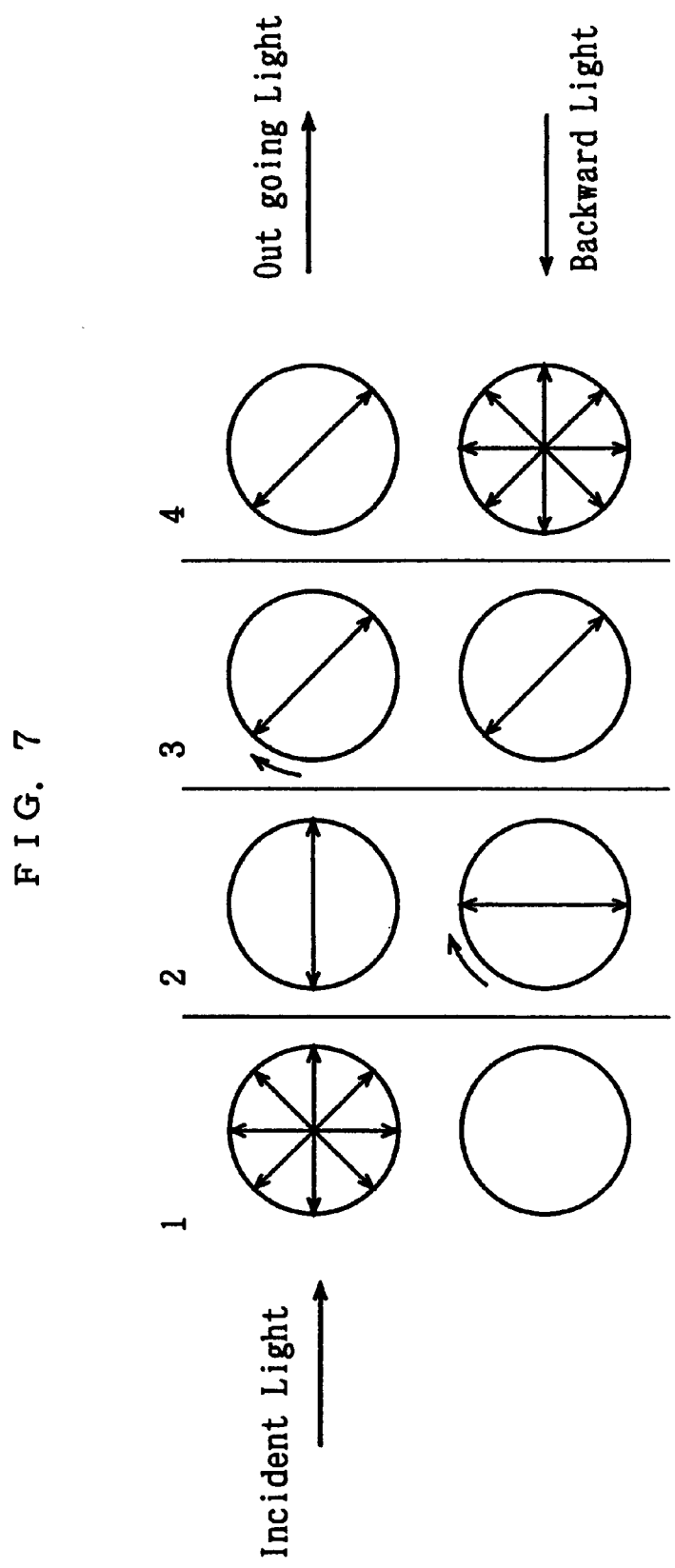
FIG. 7 is a diagram showing the operating principle of the optical isolator of the embodiment.

As shown in FIG. 7, the incident light entering from the direction A of FIG. 6 is not polarized initially. The incident light is polarized by the first polarizer 12, and the direction of polarization is turned by the Farady rotator 13. The light goes out via the second polarizer 14. A backward light that enters in the direction B of FIG. 6 is not polarized initially. A polarized light component is taken out by the second polarizer 14, and the direction of polarization is shifted by the Farady rotator 13. The light is blocked by the first polarizer 12 and will not come out. As a result, the backward light is blocked by the optical isolator 10.

Figure 8:
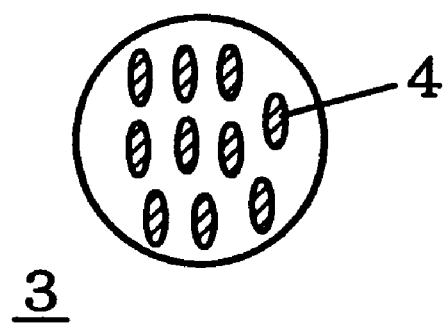
FIG. 8 is a diagram showing the arrangement of metallic particles in the first polarizer of the optical isolator of the embodiment.
Figure 9:
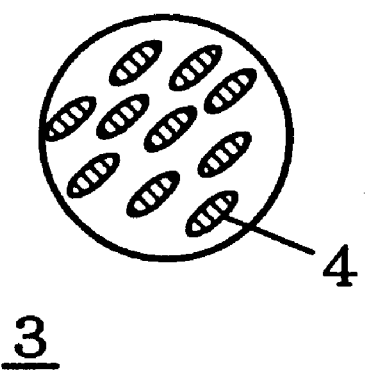
FIG. 9 is a diagram showing the arrangement of metallic particles in the second polarizer of the optical isolator of the embodiment.

FIG. 8 schematically shows the state of arrangement of the metallic particles of the first polarizer 12 seen in the direction A-B of FIG. 6. FIG. 9 schematically shows the state of arrangement of the metallic particles of the second polarizer 14 seen in the direction B-A of FIG. 6.

We claim:

1. A polarizer comprising a substrate having transparency and a polarizing layer, said polarizing layer being provided on at least one principal surface of the substrate and comprising alternately stacked plural metallic particle layers and dielectric layers formed of glass, wherein the metallic particle layers include metallic particles having morphological anisotropy, wherein the content of group 0 elements in said polarizing layer is $1.5 \times 10^{20}$ molecules/cm$^3$ or under, and wherein the surface roughness of the polarizing layer is less than about 120 Å.

2. A polarizer of claim 1 wherein said dielectric layers are formed by sputtering, and the content of a sputtering gas in said dielectric layers is not more than $1.5 \times 10^{20}$ molecules/cm$^3$.

3. A polarizer of claim 2 in which said sputtering gas is argon gas.

4. An optical isolator characterized in that the polarizer of claim 1 is provided on at least one of the light incident side and the light outgoing side of a Faraday rotator that transmits light.

* * * * *